United States Patent
Bauer et al.

(10) Patent No.: US 9,249,726 B2
(45) Date of Patent: Feb. 2, 2016

(54) MUFFLER INSERT FOR MOTOR VEHICLES AND METHOD FOR PRODUCING SAME

(75) Inventors: Thomas Bauer, Homburg (DE); Karl-Christian Regent, Wolfenbuettel (DE); Martin Schwerdtfeger, Einbeck (DE)

(73) Assignee: DBW Holding GmbH, Bovenden (DE)

( * ) Notice: Subject to any disclaimer, the term of this patent is extended or adjusted under 35 U.S.C. 154(b) by 0 days.

(21) Appl. No.: 14/001,183

(22) PCT Filed: Feb. 23, 2012

(86) PCT No.: PCT/EP2012/053073
§ 371 (c)(1),
(2), (4) Date: Oct. 31, 2013

(87) PCT Pub. No.: WO2012/113867
PCT Pub. Date: Aug. 30, 2012

(65) Prior Publication Data
US 2014/0060964 A1 Mar. 6, 2014

(30) Foreign Application Priority Data
Feb. 23, 2011 (DE) .................. 10 2011 012 202

(51) Int. Cl.
| | |
|---|---|
| *F01N 1/24* | (2006.01) |
| *F01N 1/04* | (2006.01) |
| *F02B 77/13* | (2006.01) |
| *D04H 3/002* | (2012.01) |
| *D04H 3/004* | (2012.01) |
| *D04H 3/10* | (2012.01) |
| *D04H 3/115* | (2012.01) |
| *D04H 3/12* | (2006.01) |
| *D04H 3/14* | (2012.01) |
| *B29C 53/56* | (2006.01) |
| *D04H 1/44* | (2006.01) |

(Continued)

(52) U.S. Cl.
CPC ............... *F02B 77/13* (2013.01); *B29C 53/56* (2013.01); *D04H 1/44* (2013.01); *D04H 3/002* (2013.01); *D04H 3/004* (2013.01); *D04H 3/102* (2013.01); *D04H 3/115* (2013.01); *D04H 3/12* (2013.01); *D04H 3/14* (2013.01); *F01N 1/24* (2013.01); *F01N 13/18* (2013.01); *F01N 2310/02* (2013.01)

(58) Field of Classification Search
USPC ............... 181/256, 252; 29/890.08, 890.053
See application file for complete search history.

(56) References Cited

U.S. PATENT DOCUMENTS

| | | | | | |
|---|---|---|---|---|---|
| 3,294,887 | A | * | 12/1966 | Altermatt | .................. 264/229 |
| 4,234,054 | A | * | 11/1980 | Chapin | .................. 181/252 |
| 4,296,597 | A | * | 10/1981 | Tani et al. | .................. 57/205 |

(Continued)

FOREIGN PATENT DOCUMENTS

| | | | |
|---|---|---|---|
| EP | 1 217 184 A1 | 6/2002 | |
| EP | 1217184 A1 | * 6/2002 | ............ F01N 1/24 |

(Continued)

*Primary Examiner* — Edgardo San Martin
(74) *Attorney, Agent, or Firm* — Whitham Curtis Christofferson & Cook, PC

(57) ABSTRACT

A muffler insert for motor vehicles, in particular for passenger cars and motor trucks, in the form of a shaped material made from glass fiber material, has a wound continuous glass fiber material which includes a textured glass fiber. When producing the muffler insert the glass fiber material is wound around a carrier in order to form a shaped material, and this shaped material is used as a muffler insert, if appropriate after further processing steps.

16 Claims, 1 Drawing Sheet

(51) Int. Cl.
*F01N 1/00* (2006.01)
*F01N 13/18* (2010.01)

(56) References Cited

U.S. PATENT DOCUMENTS

| | | | |
|---|---|---|---|
| 5,100,047 A * | 3/1992 | Nakagawa et al. | 228/176 |
| 5,341,632 A * | 8/1994 | Jung et al. | 57/208 |
| 5,360,656 A * | 11/1994 | Rexfelt et al. | 428/193 |
| 5,461,777 A * | 10/1995 | Ikeda et al. | 29/890.08 |
| 5,670,756 A * | 9/1997 | Ohtaka et al. | 181/256 |
| 5,718,045 A * | 2/1998 | Tsukahara et al. | 29/890.08 |
| 5,926,954 A | 7/1999 | Wolf et al. | |
| 6,094,817 A | 8/2000 | Shah et al. | |
| 6,148,955 A * | 11/2000 | Wolf et al. | 181/252 |
| 6,162,518 A * | 12/2000 | Korfer | 428/60 |
| 6,196,351 B1 * | 3/2001 | Clokey et al. | 181/252 |
| 8,501,643 B2 * | 8/2013 | Kamiya et al. | 442/332 |
| 8,505,203 B2 * | 8/2013 | Freis et al. | 29/890 |
| 2009/0242324 A1 | 10/2009 | Kamiya et al. | |

FOREIGN PATENT DOCUMENTS

| | | |
|---|---|---|
| WO | 01/69051 A1 | 9/2001 |
| WO | 2005/005796 A1 | 1/2005 |

* cited by examiner

MUFFLER INSERT FOR MOTOR VEHICLES AND METHOD FOR PRODUCING SAME

FIELD OF THE INVENTION

The present application relates in a first aspect to a muffler insert for motor vehicles, in particular for passenger cars and motor trucks. This muffler insert in the form of a shaped material made from glass fiber material is in this case present in the form of a wound continuous glass fiber material, the glass fiber material used comprising a textured glass fiber. The application is aimed in a further aspect at method for producing such a muffler insert, a glass fiber material being wound as continuous glass fiber, which is a textured glass fiber, around a carrier, in order to form a shaped material, and this shaped material being used as a muffler insert, if appropriate after further processing steps.

PRIOR ART

Mufflers have sound-damping or sound-absorbing and insulating materials. The fiber materials conventionally used for this purpose are glass fiber materials. Alternatively, other mineral fibers, such as, for example, basalt fibers, etc., are employed as sound-damping materials, particularly in mufflers for motor vehicles.

One possibility for introducing these fiber materials is to inject loose fibers into the intermediate regions of an assembled muffler. Corresponding methods are described, for example in DE 10 2005 009 045 or in EP 953 736. Disadvantages of such injection methods are that the distribution of the fiber material is not optimal, particularly in regions where injection is difficult, such as angles or other undercuts, and also in the practical implementation of the injection method for specific noncylindrical muffler contours, but also for what are known as half-shell mufflers.

As an alternative to this, the fiber materials are incorporated during the assembly of the muffler, that is to say the fiber materials are introduced into the muffler housing prior to closure. In this case, introduction may take place by various methods. Thus, one conventional method is the introduction of loose fiber material, in particular glass fiber material, filled in bags, that is to say in plastic bags, which are introduced into the mufflers during assembly. These plastic bags, which may also be in the form of netting, are usually produced from plastic or a plastic matrix, the plastic melting at higher temperatures. When the muffler is first commissioned and is heated correspondingly, this plastic melts and releases the loose glass fiber material. A major disadvantage of this method, however, is that the melting or carbonization of the plastic material causes an unpleasant smell and environmental pollution. Another disadvantage of the use of loose glass fibers filled in bags is that complex structures in the muffler cannot be filled sufficiently by the fibers. Moreover, displacement of the muffler material may occur, so that the acoustic, but also thermal properties of the glass fiber material are impaired. Furthermore, the loose glass fiber material may be blown out in course of time, so that, as well as the acoustic and thermal impairment, environmental pollution can also occur.

In an alternative method, mats made from glass fiber materials are introduced as a liner into the muffler.

The muffler is subsequently closed. These liners can be compacted by melt threads, as described in WO 99/23367. These melt threads are in this case configured in such a way that melt out when the muffler is first heated and the liner can therefore spread out completely in the free spaces of the muffler.

A method for filling mufflers of the internal combustion engines with sound-damping material is described in EP 1 861 592. The material is in this case formed from glass fibers and comprises a winding of the glass fiber threads around a tube or a reel winder in order to obtain a tubular mass of glass fibers. The mass is in this case formed in such a way that its dimensions correspond to the muffler space to be filled. After being wound, the tubular mass is removed from the tube or reel winder and, in a second step, is subsequently compacted in a further device so that a flattened tubular mass is obtained. This flattened mass is then consolidated by interlinkages formed by irreversibly woven or combined glass fibers. The muffler is subsequently closed.

DE 202 18 618 U1 describes muffler inserts which are manufactured with the aid of binders and thermal treatment.

SUMMARY

One aim of novel shaped materials, such as shaped mats or moldings, as muffler inserts in mufflers for passenger cars and motor trucks is the need to reduce the quantity of material used, so as to promote lightweight construction. This lightweight construction makes it possible to reduce the fuel consumption. Furthermore, the densities within the material of the muffler insert should be organizable in a variable way and the muffler insert itself should be capable of being introduced into the muffler in a simple way. Production itself should be improved ecologically, and in particular, during use, there should be no or only very insignificant emission of substances harmful to health, such as occurs at the present time when bags filled with loose glass fiber material are used. The method for producing these muffler inserts should be executable in a simple way, and the muffler inserts themselves should exhibit improved properties, particularly even during operation. These include an improved acoustic effect, weight production and better volume filling. Furthermore, there is a need for muffler inserts with improved blow-out safety, that is to say no glass fibers are blown out during operation, and with improved dimensional stability in order to preserve the acoustic and thermal properties.

The object on which the invention is based, therefore, is to provide a generic muffler insert for motor vehicles and a method for producing same, this muffler insert providing improved properties during operation, while at the same time being improved in economic and ecological terms.

In particular, the invention is to provide muffler inserts which provide the desired acoustic and insulating properties with as low a material outlay as possible, while at the same time reduced emission and reduced environmental pollution are achieved. In this case, this muffler insert has high dimensional stability, even during operation, and relative displacement of the fibers in the shaped material with respect to one another and also a blow-out of glass fibers are to be minimized in order to maintain the thermal and acoustic properties of the material.

The object of the invention is achieved, according to the invention, by means of a generic muffler insert. This is distinguished in that the glass fiber material is a continuous glass fiber material, this glass fiber material being a textured glass fiber.

DESCRIPTION OF THE INVENTION

In a first aspect, the invention is aimed at a muffler insert for motor vehicle, in particular for passenger cars and motor trucks with internal combustion engines, made from a glass fiber material and/or other mineral fiber material. This glass fiber material and/or other mineral fiber material in this case in the form of a wound shaped material is obtainable by winding the glass fiber material and/or other mineral fiber material around at least one carrier. The muffler insert according to the invention is distinguished in that the glass fiber material and/or other mineral fiber material is a continuous material, and furthermore the glass fiber material and/or other mineral fiber material is a textured glass fiber and/or other textured mineral fiber.

The expression "glass fiber material" is understood hereafter to mean material made from glass fibers and material made from glass fibers and other mineral fibers, such as basalt fibers or basalt wool, unless stated otherwise.

In the present context, the expression "textured" means that the glass fiber and/or other mineral fiber, which is in the form of roving, yarn or twine, but, in particular, in the form of filament, is opened with the aid of known methods. Textured glass fibers are known in the prior art.

Textured fibers are distinguished in that the opening of the fibers achieves an enlargement of volume. The fibers thus textured exhibit improved thermal and acoustic properties on account of their bulkiness.

Textured fibers are usually produced by means of air-blowing methods. Different texturing levels and therefore different densities of the glass fiber material can thereby be achieved.

In a preferred embodiment, the glass fiber material is a fancy-textured glass fiber. In the present context, the expression "fancy-textured glass fiber" is understood to mean that a second thread or roving (main thread) is wound around a core thread or basic thread or roving. Both the wound-around thread and the basic thread may in this case be correspondingly textured, that is to say in an opened state. The glass fiber material is preferably a non-twisted material, such as roving and continuous filament. However, yarns and twines, which are twisted or twined materials, may also be used in textured and, in particular, fancy-textured form.

According to the invention, the basic thread may also be or contain a melt thread or cotton thread which carbonizes or melts during heating. Such embodiments are likewise covered by the expression "glass fiber" or "mineral fiber".

Figure 1:
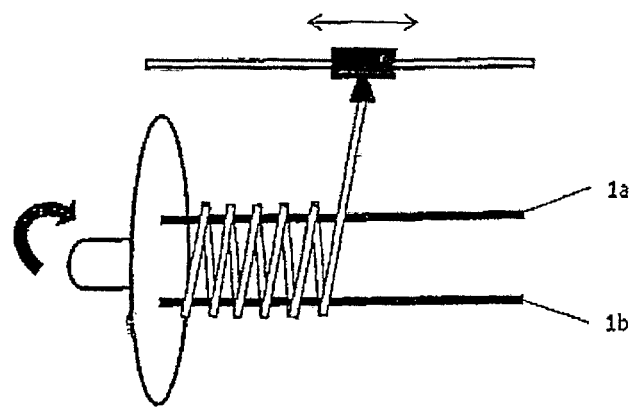
FIG. 1 is a schematic drawing showing winding of fibrous material on a carriers.

In a further embodiment of the present invention, the shaped material is obtained by the glass fiber material being wound around at least two carriers 1a and 1b as shown in FIG. 1. The at least two carriers are in this case designed such that they are preferably displaceable, so that corresponding shaped material can be produced as wound blanks of different dimensioning. The fiber material may in this case also be wound around at least three or more carriers in order to produce shaped material in the form of bodies, in particular hollow bodies. These at least three carriers, which are spaced apart from one another, are preferably displaceable in order to allow different dimensioning of the shaped material obtained.

The carriers may in this case be in the form of bars or tubes. Alternatively, the carriers may also be metal sheets or carriers of different dimensioning. If only one carrier is used, this is preferably in the form of a cylinder which, if appropriate, is hollow. The carriers may also have a discontinuous diameter. Furthermore, the carriers may be straight or of bent form in order to give the shaped material a predetermined shape. The carriers, such as corresponding bars, may in this case be correspondingly bent and discontinuously dimensioned in their diameter such that the wound blank acquires a correspondingly desired structure and shape.

On account of the texturing of the glass fiber or of the other mineral fiber, in particular on account of the fancy texturing of the glass fiber, it is possible to provide from glass fiber material wound blanks as wound shaped material which, by hooking together or interacting with nearby fibers, prevents a wound structure from being torn open and therefore the thermal and acoustic properties from being impaired during operation. The displacement of the glass fibers which may cause heaping or the formation of gaps in the shaped material and is brought about, for example, by jolts and vibrations during operation is thereby reduced, and the desired properties of the muffler insert are improved over the course of the operating time.

Figure 2:
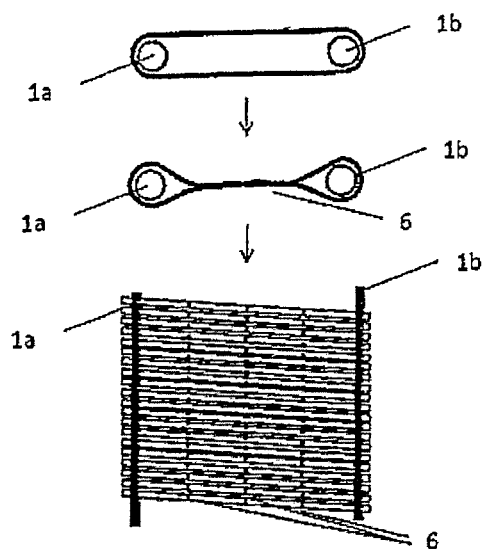
FIG. 2 is a schematic drawing showing solidification on the carriers.

In another preferred embodiment, the shaped material in the form of a wound blank is further permanently consolidated in order to form a consolidated shaped material. FIG. 2 shows this subsequent consolidation 6 of the wound blank preferably takes place on the carriers 1a and 1b. As a result of consolidation, the structure or shape is correspondingly preserved, since the wound blank still remains on the shaping carriers during consolidation.

It is possible in a correspondingly simple way to give the wound blank a permanent shape in the form of a shaped mat or of a molding, particularly also in the form of a hollow body. It is in this case preferable that consolidation is carried out without a binder. These binders require additional thermal treatment and have disadvantages from an economic and ecological point of view.

With the aid of the muffler insert according to the invention, even complicated desired shapes of the muffler chamber in the muffler can be filled by the shaped material. It is correspondingly possible to produce muffler inserts (semifinished products or components) in which the quantity of fiber material used is reduced in order thereby to allow lightweight construction. The result of this lightweight construction is that ecological benefits, such as a lowering of fuel consumption, etc., are achieved. Furthermore, outstanding dimensional stability is obtained, using the textured fiber which is employed as continuous material.

Possible further consolidation of the present shaped material obtained in the form of a wound blank may in this case take place by means of air swirling, stitching, interlinking, knotting, needling, felting or crocheting, and in this case consolidation of the wound blank preferably takes place directly on the carrier. However, it is also preferable that the shaped material has no additional consolidation of any kind and at the same time preserves its dimensional stability. In particular, it is preferable that the muffler insert has no binders.

Consolidation, in particular continuous consolidation, is preferably permanent. In the present context, the expression "permanent" is understood to mean that consolidation persists at least until the muffler insert is installed and the muffler is closed. If appropriate, when corresponding materials, such as melt thread or cotton thread, with low melting or destruction temperatures are used, at least partial breakdown of consolidation may take place after installation, so that the muffler insert can fill the muffler chamber completely inside the housing.

In one embodiment, however, consolidation is preferably at least partially permanent even during operation, in order to ensure dimensional stability and fiber stability in relation to use. According to the invention, further, the muffler insert may be brought to a desired shape by string tying. This string tying is preferably carried out with a melt thread or cotton thread in order to bring the muffler insert into a preferred shape for installation in the muffler. This shape is cancelled again when the muffler is commissioned. Corresponding string tying thus makes it possible to install the muffler insert into the muffler chamber in a simple way. When the string tying is loosed, the muffler chamber can then be filled completely by the muffler insert. Suitable materials and methods are known to a person skilled in the art.

The muffler insert according to the invention is distinguished, in a preferred embodiment, in that it has no binder. Method steps during production can thereby be avoided. The production costs, but also environmental pollution, can likewise be reduced during operation. The wound shaped material is obtainable by the glass fiber material being wound around at least one carrier. The fiber material is in this case preferably wound helically, in particular with a pitch of >3%. By the traveler being appropriately guided during winding, corresponding wound blanks can be obtained. In an alternative embodiment, the fibers may be guided essentially in parallel. The fibers may be wound in a single ply or preferably in a plurality of plies, while winding may also be contradirectional, as already known to a person skilled in the art.

The muffler inserts according to the invention, made from textured glass fiber or textured other mineral fibers, in particular from fancy-textured glass fiber, are distinguished by a weight reduction, better volume filling and a better thermal and acoustic effect. The handling of the muffler insert when it is being installed in the muffler is improved on account of the dimensional stability. The product has a pleasant feel when it is being installed. Particularly by continuous fiber material being used, the strain upon workers which is caused by small pieces of glass fiber is reduced. Furthermore, by the continuous material being used, the dimensional stability of the muffler insert is improved per se. There is no displacement of the fiber material in the muffler, so that the acoustic and thermal properties of the muffler material are preserved during operation. Finally, by continuous material being used and the cost of the interlinking or interlocking of the textured fibers with one another, this muffler insert has improved safety against a blow-out of glass fibers. This is achieved, in particular, even without further work steps, such as needling.

Accordingly, the muffler inserts according to the invention have both ecological and economic benefits, as compared with known muffler inserts.

In a further aspect, the present application relates to a method for producing a muffler insert for mufflers, in particular for fuel-driven passenger car and motor truck mufflers, this muffler insert comprising a sound-damping, sound-absorbing or insulating shaped material made from glass fiber material. The method according to the invention comprises the following steps:

Winding of the glass fiber material around at least one carrier in order to produce a sound-damping, sound-absorbing or insulating shaped material in the form of a wound blank, the glass fiber material being a continuous glass fiber material and the glass fiber being a textured glass fiber, in particular a fancy-textured glass fiber. Especially preferably, in this method, a single-strand fancy-textured continuous filament is used.

The method according to the invention is preferably carried out in such a way that the glass fiber material is wound around at least two carriers. In a further embodiment, at least three or more carriers may be used. The carriers may in this case be such as those described above.

The winding of the glass fiber material may in this case take place helically, in particular with a pitch of 3%. Alternatively, winding may be essentially guided in parallel. The method may in this case be designed for the production of wound shaped material as continuous shaped material. Alternatively, the method according to the invention makes it possible to form shaped material of a defined dimension. In particular, it is possible to provide exactly fitting shaped materials, such as shaped mats or moldings. The bodies thus produced may in this case be rotationally or nonrotationally symmetrical parts.

When a continuous shaped material is produced, the product may be wound as roll stock or be cut to the desired final contour by a corresponding device. Cutting may in this case take place at a predetermined angle or else with another contour. The type of winding, the winding density and, if appropriate, subsequent consolidation may also influence the volume of the muffler insert produced. Particularly when the fiber material used is fancy-textured materials in which a main thread is textured, free of tension, around a basic thread, positive influence upon voluminization is thereby achieved.

In one embodiment of the present invention, the method may, furthermore, comprise the step of permanent consolidation of the wound blank present on the carriers, in order to form a sound-damping, sound-absorbing or insulating shaped material. In a further step, this shaped material thus obtained may be brought to a desired shape by string tying, as stated above. In particular, permanent consolidation is a type of consolidation which is carried out without a binder.

Finally, according to the invention, a muffler having a muffler insert according to the invention is provided. This muffler insert may be obtainable with the aid of the method according to the invention.

The production of the muffler insert may in this case take place by means of a device which allows winding and at the same time texturing of the glass fiber threads, in particular of the roving or monofilament. It is therefore possible, in step d) of a method, to produce the muffler inserts according to the invention from textured, in particular fancy-textured glass fibers.

The invention claimed is:

1. A muffler insert for motor vehicles made from a glass fiber material, the glass fiber material being obtainable in the form of a wound shaped material of the glass fiber material being wound around at least one carrier, wherein the glass fiber material is a continuous material, wherein the glass fiber material comprises a textured glass fiber, wherein the wound shaped material is present in form of a shaped mat or of a molding, and wherein the wound shaped material has no binder.

2. The muffler insert as claimed in claim 1, wherein the glass fiber material comprises a fancy-textured glass fiber.

3. The muffler insert as claimed in claim 1, wherein the wound shaped material is in a form obtainable by the glass fiber material being wound around at least two carriers.

4. The muffler insert as claimed in claim 1, wherein the wound shaped material thus obtained in the form of a wound blank is permanently consolidated in order to form a consolidated shaped material.

5. The muffler insert as claimed in claim 4, wherein consolidation is by means of air swirling, stitching, interlinking, knotting, needling, felting or crocheting.

6. The muffler insert as claimed in claim 1, wherein the shaped material has no additional consolidation of any kind.

7. The muffler insert as claimed in claim 1, wherein the basic yarn of the fancy-textured glass fiber material contains a melt thread or at least one fiber of the glass fiber material.

8. A method for producing a muffler insert for mufflers, the muffler insert comprising a sound-damping, sound-absorbing or insulating shaped material made from glass fiber material wherein the glass fiber material is a continuous glass fiber material, and the glass fiber material is a textured glass fiber material comprising:

winding of the glass fiber material around at least one carrier in order to produce a sound-damping, sound-absorbing or insulating shaped material in the form of a wound blank, wherein the wound blank is in a permanent shape in the form of a shaped mat or of a molding and no binder is used in the production of the muffler insert.

9. The method as claimed in claim 8, wherein the glass fiber material has a fancy-textured glass fiber.

10. The method as claimed in claim 8, wherein the continuous glass fiber material is a single-strand continuous filament.

11. The method as claimed in claim 8, wherein the glass fiber material is wound around at least two carriers.

12. The method as claimed in claim 8, further comprising the step of permanent consolidation of the wound blank present on the carriers, in order to form said sound-damping, sound-absorbing or insulating shaped material, said permanent consolidation being performed by means of air swirling, stitching, interlinking, knotting, needling, felting or crocheting.

13. A muffler having a muffler insert as claimed in claim 1.

14. The muffler insert as claimed in claim 1 being configured for passenger cars or motor trucks with internal combustion engines.

15. The muffler insert as claimed in claim 1 wherein the glass fiber material is a continuous filament.

16. The method as claimed in claim 8, wherein the muffler insert is configured for passenger cars or motor trucks with internal combustion engines.

* * * * *